May 12, 1964 J. L. KEEN ETAL 3,132,681
PROCESS OF SPLITTING AND HULLING GUAR BEANS
Filed June 28, 1961 2 Sheets-Sheet 1

INVENTORS
JAMES L. KEEN
BY RICHARD W. WESTEEN

Moore, White & Burd
ATTORNEYS

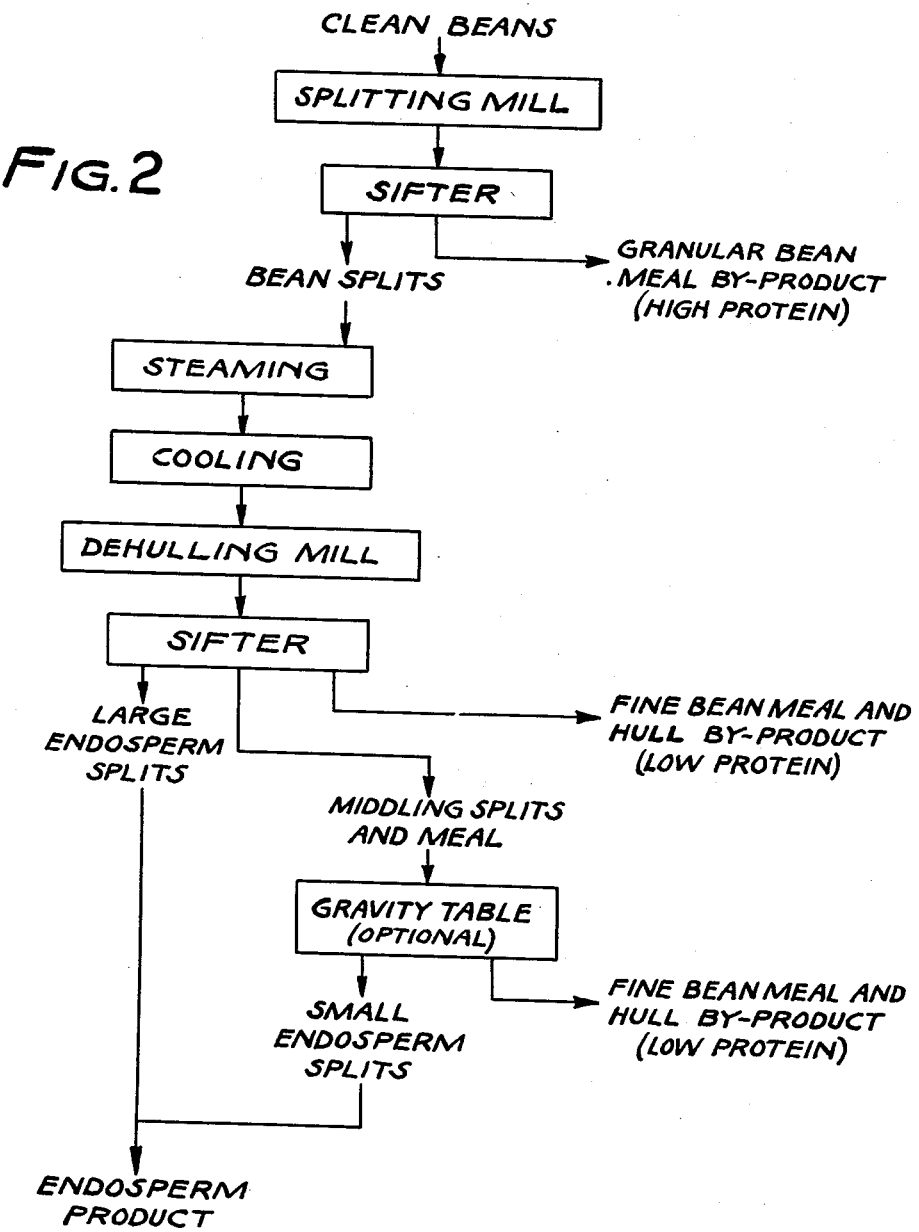

3,132,681
PROCESS OF SPLITTING AND HULLING GUAR BEANS
James L. Keen, New Brighton, and Richard W. Westeen, Golden Valley, Minn., assignors to General Mills, Inc., a corporation of Delaware
Filed June 28, 1961, Ser. No. 120,294
17 Claims. (Cl. 146—221.8)

This invention relates to a process of milling beans for the production of endosperm. More particularly, this invention relates to the process of milling guar beans (*Cyamopsis psoraliodes* or *Cyamopsis tetragonolobus*) and locust beans (*Ceratonia siliqua*) for the purpose of removing the bean seedcoat or hull and the germ in order to separate out and recover the endosperm. It is the object of this invention to obtain stabilized endosperm free from affixed hull and germ. The endosperm product when ground into a gum is useful in paper sizing and textile sizing; as a protective colloid, stabilizer, thickening and film forming agent; and other related uses.

The beans as originally obtained from the pod are covered with a tightly adhering seedcoat or hull which is hard and resistant to shattering. The endosperm is firmly bonded to the inside of the hull making separation of the endosperm from the hull by conventional milling means extremely difficult. It is virtually impossible by conventional means to obtain high recovery of endosperm free from contamination by bits of hull and germ.

For convenience, the invention will be described with particular reference to guar beans but it is to be understood that the invention is not so limited. The process is equally applicable to locust beans, as demonstrated in Example 4, and other structurally similar and botanically related beans, seeds and kernels having a hard hull tightly adherent to the endosperm.

Guar beans are produced extensively in India, Pakistan, and nearby regions of southern Asia, and to a more limited extent in the southwestern United States. The beans have a diameter of about 3/16 inch. Guar beans consist of an outer hull or seedcoat covering the whole seed. Two opposing and generally hemispherically shaped pieces of endosperm lie directly beneath the seedcoat and two disc shaped pieces of germ lie in face-to-face abutment between the endosperm hemispheres. The bean is composed of about 20% hull, 35% endosperm and 45% germ.

The bean is hard and difficult to break but, when subjected to impact, tends to break between the hemispheric endosperm pieces to separate the two endosperm particles and free the disc shaped germ. The two germ discs usually remain together but are quite friable and easily ground. The hull is very tightly attached to the endosperm pieces and is not removed by a simple impacting of the endosperm pieces. The endosperm hemispheres, commonly referred to as "splits," are extremely tough and very difficult to grind. The normal moisture content of the guar beans is about 10 to 12%.

One of the present methods of removing hull from guar beans involves flame peeling by which the hull is removed by burning it away in a gas flame. This method may be practiced only on the whole beans. Flame peeling destroys any by-product value of the hull and discolors and degrades the remaining portions of the bean. Hull removal by dry milling without pretreatment is relatively ineffective. Bean splits may be frozen as an aid in the dry milling away of the hull but this involves the use of elaborate and expensive equipment. Acid and alkali treatment of the beans or splits to remove or loosen the hull degrades the galactomannan gum of which the endosperm is principally composed and contaminates it with acid or alkali.

Broadly stated, the preferred form of the invention comprises splitting the beans under controlled impact conditions while at the same time grinding the contained germ; separating the ground germ from the unground endosperm "splits" with their affixed hull by screening; treating these splits by subjecting to controlled heat and moisture conditions and subsequently cooling to loosen the hull from the endosperm; then subjecting to further controlled impact milling to remove and grind the loosened hull while keeping the endosperm intact; and, finally, separating the free endosperm from the ground hull by screening.

The invention is illustrated by the accompanying drawings in which:

FIGURE 2 is a flow sheet of the preferred form of the process of the invention.

Figure 1:
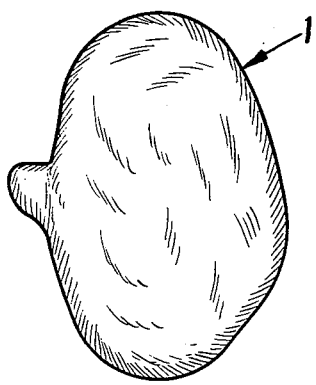
FIGURE 1 is an elevation of a typical guar bean and FIGURE 1A is a simplified and schematic cross-sectional view of a guar bean and structurally related beans.
Figure 1A:
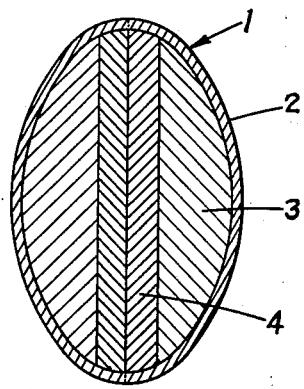

The structure and composition of the guar bean 1, as shown schematically in cross section in FIGURE 1A, is such that when subjected to impact, it splits into two generally hemispherical halves, each composed of a thin hard hemispherical hull 2, a hard hemispherical endosperm 3 and a thin generally circular flat disc 4 comprising the germ. The germ is relatively brittle and friable. Substantially lesser impact is required to split the bean at the natural division or interface between the two endosperm and germ halves than to shatter the hull at any other place. This fact permits the mill operator to readily control the impact exerted upon the beans so as to split them only, without other breaking or shattering of the hull or endosperm. Because the germ is relatively loosely attached and is friable, the same magnitude of impact which splits the bean is also sufficient to dislodge and reduce the germ.

The initial splitting may be accomplished in any type mill which will break or split the beans under controlled impacting while leaving the endosperm and attached hull intact. The impact is most readily controlled by adjustment of the rate of rotation of the mill to a speed which will split the beans but which is insufficient to break the bean splits. This controlled impact is within the skill of the milling art. Wide latitude in operating conditions is possible since materially greater force is required to shatter the endosperm than is required to merely split the bean.

Exemplary splitting mills include hammer mills and like mills in which reduction is accomplished by impact applied directly to the bean by a movable member. The splitting mill is provided with a screen having openings of a size which will pass splits but will not pass whole beans. Guar beans are sufficiently uniform in size as to make this easy to accomplish. In this manner, whole beans are retained in the reducing area of the mill until they are impacted and split.

The use of such a restricted discharge on the mill permits the maintenance of a substantial material load in the mill at any time. Under these conditions, the softer and more friable germ pieces are ground by the large number of harder beans and splits and pass out with the undehulled endosperm pieces. This product from the splitting mill is then sifted, using conventional sifting equipment with proper sized screens to pass the reduced germ product while retaining substantially germ free endosperm splits with attached hull. The germ product is disposed of as a by-product, as, for example, a feed ingredient, and the endosperm splits are conditioned to facilitate removal of the hull.

Optimum operating conditions for splitting are effected by many factors, including the mill size, design, hammer construction (for example, whether the hammers are loose or rigid), mill load, screen size, bean moisture content, etc. In general, hammer tip speeds of approximately 75 to 150 feet per second are required to accomplish splitting, depending upon other conditions present. For example, lower speeds are required when the mill is equipped with rigid hammers, when the average retention time of the beans in the mill is greater when the concentration of beans in the mill is lighter, when there is greater clearance between hammer and housing, etc. Conversely, higher tip speeds are required with loose hammers, lower average retention time of the beans in the mill, heavier concentration of beans in the mill, less clearance between hammers and housing, etc. Because the impact required to shatter the bean is substantially greater than that required to split the bean, wide variations in operating practices are permitted without substantially changing the result. For this reason, the optimum operating conditions are easily determined in practice.

Guar bean splits are a staple article of commerce, particularly as an import from abroad. When the starting raw material is purchased in the form of splits, the initial splitting step is, of course, omitted and the split endosperm pieces with attached hull are immediately subjected to the conditioning step to loosen the hull.

From whatever source, the edosperm splits are subjected to heat and moisture, both for the purpose of loosening the hull and stabilizing the endosperm. The endosperm splits are subjected to an elevated temperature between about 170 and 250° F. in the presence of moisture for about 1 to 15 minutes, or more, to produce a net increase of from about 2 to 5% moisture in the endosperm splits. The moisture content of the split is desirably raised to the range from about 12% to 17% and desirably to between about 14% and 17%. During treatment the moisture content of the splits may be raised to 20% or more, but, upon cooling, the moisture level drops to these ranges.

The splits should be heated for at least one minute in order to inactivate any seed borne organisms and natural plant enzymes and to denature protein. Desirably the splits are heated to about 200° F. for about 5 to 10 minutes or the equivalent. Where lower temperatures are used, the time of heat treatment may be longer and where higher temperatures are used, it may be shorter. Although longer heating times than 10 to 15 minutes may be utilized, no advantage is obtained and completion of the process is needlessly prolonged.

The treatment of the endosperm splits is most easily accomplished by subjecting the splits to steam either at atmospheric or low pressures. The steam treatment may be carried out in a wide variety of batch or continuous mixing equipment, such as a ribbon blender or a screw conveyor fitted with steam jets. The endosperm splits may be conditioned by treatment with hot water. Where excessive moisture is present or is added as a result of the treatment, the splits may be partially dehydrated by treatment with superatmospheric steam to reduce the moisture content to the range of about 12 to 17%. Heat from another source may also be used to supplement heat from steam. Moisture control of the splits affects their behavior since the friability of the endosperm is greatly influenced by the moisture level.

After the heat and moisture treatment, the splits are cooled before further processing. They are desirably cooled to a temperature between room temperature and about 160° F. and preferably between about 120 to 130° F. The splits at this stage are partially or completely stabilized and, although undehulled, the hull has been loosened. This product is then subjected to a dehulling step.

Dehulling is carried out in a mill in which the steamed and cooled splits are subjected to a controlled impacting sufficient to break and grind the hull from the hemispherically shaped endosperm pieces without grinding the endosperm. Generally the same type of mill may be used for this purpose as used in initially splitting the beans. The mill is desirably provided with a restricted discharge in the form of a screen or plate having slots or circular holes of such dimensions which will pass the dehulled endosperm halves while retaining the undehulled splits in the mill.

After the steam and moisture treatment, the hull is loosened from the endosperm and is easily dislodged under controlled impact. The treated hull is more friable than the endosperm. Under impact, the hull not only separates from the endosperm but becomes broken and ground as a result of impact and abrasion with the endosperm particles and the undehulled splits in the mill. This is because the endosperm is much harder and requires substantially greater force to reduce than does the treated hull.

The impact in the dehulling mill is controlled so as to be sufficient to remove and break the hull without breaking the endosperm. Although the dehulling mill is operated at somewhat greater speeds than the splitting mill, the selection of optimum operating conditions is within the skill of the milling art. Because of the substantially greater ease with which the hull may be broken, wide latitude is permitted in the milling operation. If the endosperm is broken in the dehulling operation, the conditions are too severe and can be easily moderated by adjustment of the speed of the mill by the operator. At the same time, if the hulls are not readily separated and broken, the impacting force may be increased, as for example, by increasing the speed of rotation. Typically in a 24" mill, dehulling is accomplished at tip speeds between about 200 and 260 feet per second.

The product from the dehulling mill is sifted in conventional equipment fitted with screens of proper size to pass the broken and ground hull particles while retaining the germ-free dehulled coarser sized endosperm product. Any germ fragments which might still be clinging to the endosperm after the splitting step are dislodged and separated during the dehulling step. The hull fraction is recovered as a by-product. The endosperm product is ground to guar gum for commercial usage.

Optionally, the product from the dehulling mill is divided in the sifter into three fractions, namely, the hull by-product fraction which may also contain some fine bean meal, the large endosperm splits, and an intermediate fraction composed of middling splits and meal. This intermediate fraction is then subjected to a gravity table to recover the smaller and broken endosperm splits which are combined with the large endosperm splits to make up the endosperm product which is ground into guar gum. The remainder of the intermediate fraction from the sifter is recovered from the gravity table as a fine bean meal and hull by-product. The meal fractions may be kept separate or may be combined as desired.

Figure 3:
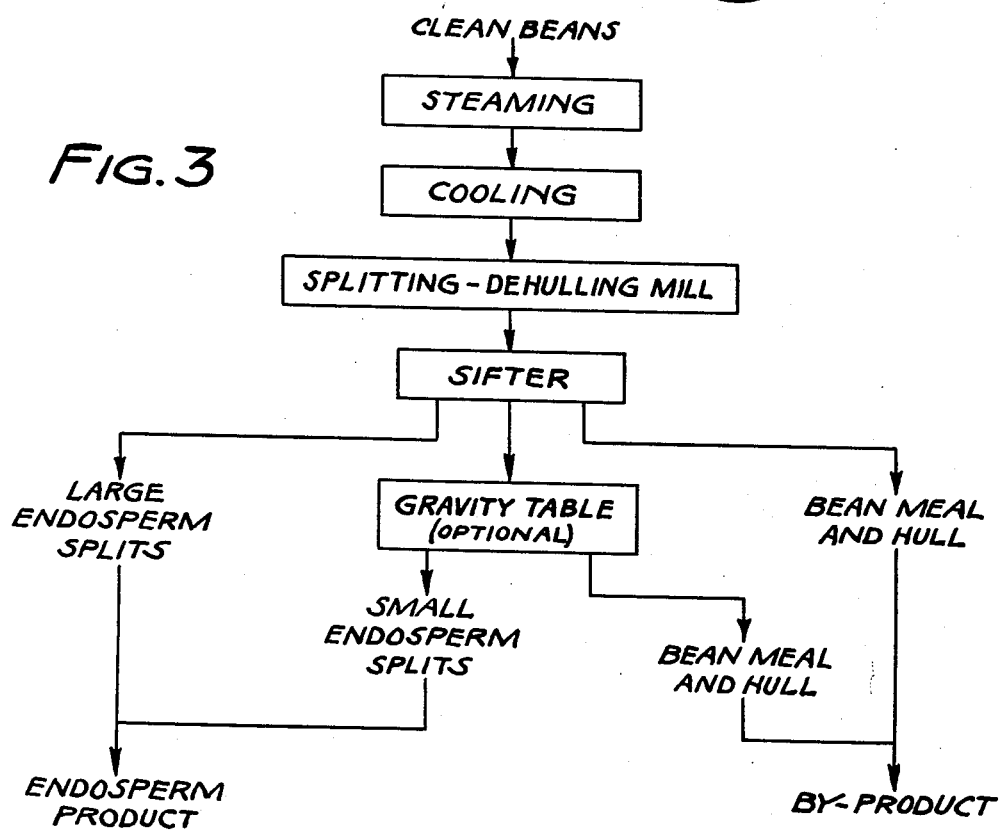
FIGURE 3 is a flow sheet of a modified form of the process of the invention.

Although it is less desirable to do so, it is possible to stabilize the endosperm in the whole bean and loosen the hull and then combine the splitting and dehulling steps as shown schematically in the flow sheet of FIGURE 3. More intensive steam treatment is required to steam the whole bean. This necessitates a greater amount of steam equipment. For some purposes it is undesirable to subject guar germ and guar endosperm to steaming together because the steamed germ imparts an odor to the endosperm material. Where the bean is steamed prior to splitting, then the splitting, degerming and dehulling are accomplished in a single mill. Thus, of necessity, the ground germ and ground hull must be recovered together instead of as separate fractions.

It has been established that endosperm resulting from the milling process of the present invention gives superior performance when reduced to guar gum and dissolved in water. Guar gum produces highly viscous aqueous solutions at low concentrations and is widely used as a paper additive, in mining as a depressant and flocculent, and in other industrial processes. For comparison 1% aqueous solutions were prepared using gum prepared from flame peeled splits and from steamed splits according to the present invention. Small amounts of phenol were added to the solutions to curb bacterial growth. Over a period of one to two weeks, the viscosity of the sol prepared from the flame peeled splits dropped from ⅓ to ⅔ as measured by a Brookfield viscometer. The viscosity of the sols prepared from the steamed splits according to the present invention remains essentially unchanged over the same period of time. This improved result is believed to flow from the stabilization of the endosperm by steaming to inactivate seed borne microorganisms and enzymes.

The invention is further illustrated, but not limited, by the following examples:

Example 1

A conventional hammer mill is fitted with a screen provided with one-sixteenth by one-half inch slots as a restrictive discharge from the mill. The mill was operated at 1075 r.p.m. Clean, dry guar beans having moisture content of 11.6% were fed into the mill at a rate to maintain a quantity of beans in the mill at all times. The openings in the restricted discharge were of such size as to permit the discharge of split beans only, while maintaining unsplit beans in the mill. When the mill is operated at this speed the beans were readily split in half with the hull remaining firmly attached to the endosperm but the germ was dislodged and reduced and discharged from the mill, along with the undehulled splits, in the form of fine particles. These germ particles were separated from the endosperm splits by screening. A batch of such undehulled splits was steamed in a ribbon blender equipped with a steam inlet supply. The splits were steamed to about 215 to 220° F. for about five minutes. The moisture increase of the beans amounted to about 4%. The steamed splits were mixed in an air stream for about ½ hour and cooled to about 125° F. Such cooled beans were then dehulled by impact in a hammer mill fitted with a screen provided with ⅛ inch openings and operated at about 1325 r.p.m., a somewhat lower speed than normal. Under these operating conditions, the hull was readily separated from the endosperm and broken while the endosperm itself remained intact. The discharge openings were of such size as to pass the endosperm freed from hull and the ground hull particles while retaining the undehulled splits in the hammer mill. A typical yield of about 33% dehulled endosperm splits is obtained. The endosperm is separated from the hull particles and any remaining germ fragments by sifting. The resulting clean germ-free and hull-free endosperm is ground to produce guar gum.

Example 2

In other test runs, a hammer mill was employed in the splitting step under varying conditions including speeds up to 1325 r.p.m and a screen with ⁵⁄₆₄ by ¾ inch openings. Endosperm splits were stabilized and the hull loosened by steaming under atmospheric pressure for varying times up to ten minutes. For the most part, temperatures of 200 to 220° F. have been used. Splits have also been autoclaved for five to fifteen minutes at temperatures up to 250° F. and pressures of 5 lbs. or greater. For the dehulling step, a hammer mill has been employed operating at speeds from 1325 r.p.m. up to 1525 r.p.m., but lower than normal operating speeds.

Whole guar beans have been treated, for example, by submerging in 203° F. water for two minutes, by steaming for five minutes, and by autoclaving at 250° F. for five to fifteen minutes. In each instance, it has been established that the beans may be split, degermed and dehulled readily under the conditions already described. As heretofore explained, however, this mode of treatment is less desirable and less economic than that in which the split beans are treated to loosen the hull.

Example 3

In a commercial run, clean guar beans, containing about 11 to 12% moisture and consisting of about 35% dark beans, were put through a hammer mill adapted with a slotted screen for splitting purposes at the rate of about 300 parts by weight per hour. After sifting, about 123 parts by weight per hour of granular bean meal and 177 parts by weight per hour of 17% protein bean splits were obtained. The granular bean meal was retained for blending into a final product, while the bean splits were subjected to a steam and moisture trreatment of about 205° F. in a commercial ribbon blender adapted for that purpose. The splits were then cooled to about 130° F. in the blender and put through a hammer mill dehuller adapted with a punched hole screen for restricted discharge. After sifting, 35 parts by weight per hour of fine bean meal and hull, 43 parts by weight per hour of middling splits and meal, and 99 parts by weight per hour of splits were obtained. The 43 parts by weight per hour of middling splits and meal were put over a gravity table and 25 parts by weight per hour of fine bean meal and 18 parts by weight per hour of splits were obtained. The split products were combined to give a split endosperm recovery of 117 parts by weight per hour of 9% protein endosperm splits. These splits were further ground to produce 108 parts by weight per hour of a final product of 7.8% protein gum and 11 to 12% moisture, and 9 parts by weight per hour of 30% protein filter dust. The filter dust, fine bean meals with hulls, and granular bean meal were combined and blended to give about 192 parts by weight per hour of a 35% protein, 13% fiber, 11% moisture product.

Example 4

In another investigation, locust bean seeds were subjected to the milling process. Similar results to those obtained with guar beans were noted.

By means of the process of the present invention, yields of endosperm of 90% and above have been obtained. In addition better process flexibility is possible. Products having virtually any desired combination of bean meal and hull by-product of high, medium or low protein may be obtained. It is possible to readily adjust operating conditions for different beans in order to insure a high endosperm yield. A major advantage of the present process, in contrast with existing milling processes, is that the endosperm emerges intact. Breaking is avoided. Recycling is unnecessary.

It is apparent that many modifications and variations of this invention as hereinbefore set forth may be made without departing from the spirit and scope thereof. The specific embodiments described are given by way of example only and the invention is limited only by the terms of the appended claims.

We claim:

1. In the process of milling guar beans and beans of similar structure to recover and separate the endosperm, the improvement which resides in subjecting said beans to heat and moisture to loosen the hull and stabilize the endosperm, cooling said beans after heating, subjecting the beans to controlled impact sufficient to split said beans and to break off and reduce the more friable germ and loosened hull through impact and abrasion with the harder endosperm without materially reducing the harder endosperm, said beans being subjected to impact in an area having a restricted discharge with openings of a size sufficient to pass dehulled endosperm and smaller particles without passing undehulled beans so as to retain undehulled beans in the impact area until dehulled, and separating the larger freed endosperm particles from the remaining reduced portions of the bean.

2. The process according to claim 1 further characterized in that said beans are heated at about 170° to 250° F. for about 1 to 15 minutes.

3. The process according to claim 2 further characterized in that said beans are heated in the presence of moisture to produce a net increase of fram about 2% to 5% moisture to bring the total bean moisture to about 12% to 17%.

4. The process according to claim 3 further characterized in that said beans are heated with steam.

5. The process of claim 4 further characterized in that said beans are cooled to the range between about room temperature and 160° F.

6. In the process of milling guar beans and beans of similar structure to recover and separate the endosperm, the improvement which resides in subjecting the beans to controlled impact sufficient to split the beans and break off and reduce the more friable bean germ without materially reducing the harder endosperm with attached hull, separating the larger split beans from the smaller reduced germ particles, subjecting said split beans to heat and moisture to loosen the hull and stabilize the endosperm, subjecting said split beans to controlled impact sufficient to break off and reduce the more friable hull without materially reducing the harder endosperm, and separating the larger freed endosperm particles from the remaining reduced portion of the bean.

7. The process according to claim 6 further characterized in that the split beans are continuously separated from unsplit beans by passing through openings of length greater than average bean diameter and width less than average bean diameter.

8. The process of milling guar beans and beans of similar structure having a tightly adherent hull to recover and separate the endosperm, which process comprises splitting the beans by subjecting clean dry beans to controlled impact sufficient to split the beans and break off and reduce the more friable bean germ without materially reducing the harder endosperm with attached hull, separating the larger split beans from reduced germ, subjecting said split beans to heat and moisture to loosen the hull and stabilize the endosperm, dehulling the split beans by subjecting the thus treated splits to controlled impact sufficient to break off and reduce the more friable hull without materially reducing the harder endosperm, and separating the larger freed endosperm particles from the smaller reduced hull particles.

9. A process according to claim 8 further characterized in that said beans are split by being subjected to controlled impact in an area having a restricted discharge with openings of a size sufficient to pass undehulled split beans and smaller particles without passing whole beans so as to retain the whole beans in the impact area until split.

10. The process according to claim 9 further characterized in that the split beans are continuously separated from unsplit beans by passing through openings of length greater than average bean diameter and width less than average bean diameter.

11. The process according to claim 8 further characterized in that said split beans are cooled after heating and before dehulling.

12. The process according to claim 8 further characterized in that said beans are heated at about 170° to 250° F. for about 1 to 15 minutes.

13. The process according to claim 12 further characterized in that said beans are heated in the presence of moisture to produce a net increase of from about 2% to 5% moisture to bring the total bean moisture to about 12% to 17%.

14. The process according to claim 13 further characterized in that said beans are heated with steam.

15. The process of claim 14 further characterized in that said beans are cooled to the range between about room temperature and 160° F.

16. The process according to claim 8 further characterized in that said split beans are dehulled by being subjected to controlled impact in an area having a restricted discharge with openings of a size sufficient to pass dehulled endosperm and smaller particles without passing undehulled split beans so as to retain undehulled split beans in the impact area until dehulled.

17. The process of milling guar beans and beans of similar structure having a tightly adherent hull to recover and separate the endosperm, which process comprises splitting the beans by subjecting clean, dry beans to controlled impact sufficient to split the beans and break off and reduce the more friable bean germ without materially reducing the harder endosperm with attached hull, said beans being split by being subjected to controlled impact in an area having a restricted discharge with openings of a size sufficient to pass split beans and smaller particles without passing whole beans, said split beans and smaller particles being continuously separated from unsplit beans by passing through openings of length greater than average bean diameter and width less than average bean diameter, so as to retain whole beans in the impact area until split; sifting to separate the larger split beans from reduced germ; subjecting said split beans to heat and moisture to loosen the hull and stabilize the endosperm by heating with steam to a temperature between about 170° to 250° F. for about 1 to 15 minutes to produce a net increase of from about 2% to 5% moisture to bring the total bean moisture to about 12% to 17%; cooling said steamed bean splits to the range between about room temperature and 160° F.; dehulling the cooled bean splits by subjecting to controlled impact sufficient to break off and reduce the more friable loosened hull without materially reducing the harder endosperm, said splits being dehulled by being subjected to controlled impact in an area having a restricted discharge with openings of a size sufficient to pass dehulled endosperm and smaller particles without passing undehulled bean splits, so as to retain undehulled bean splits in the impact area until dehulled; and sifting to separate the larger freed endosperm particles from the smaller reduced hull particles.

References Cited in the file of this patent

UNITED STATES PATENTS

| | | |
|---|---|---|
| 262,504 | Teter | Aug. 8, 1882 |
| 2,217,112 | Hamring | Oct. 8, 1940 |
| 2,667,905 | Tanner | Feb. 2, 1954 |

FOREIGN PATENTS

| | | |
|---|---|---|
| 660,033 | Great Britain | Oct. 31, 1951 |